Figure 1:
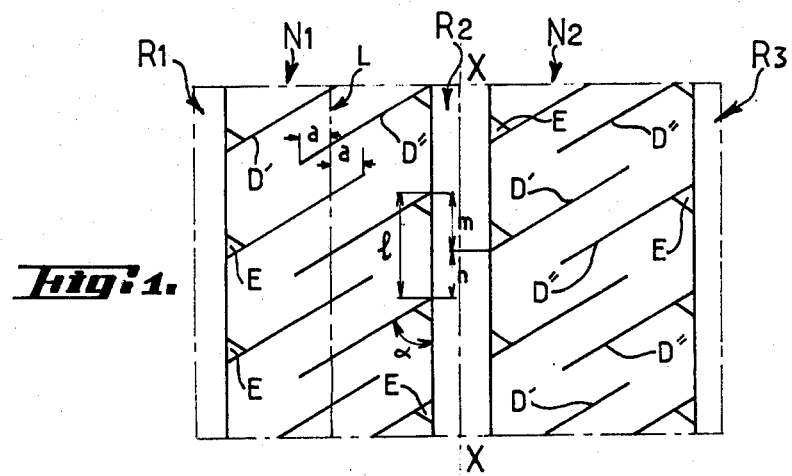

United States Patent [19]
Mirtain et al.

[11] 4,387,754
[45] Jun. 14, 1983

[54] TIRE TREAD PATTERN

[75] Inventors: Henri J. Mirtain, Compiegne, France; Norbert Zinnen, Aachen, Fed. Rep. of Germany

[73] Assignees: Pneu Uniroyal Englebert, Clairoix, France; Uniroyal Englebert Reifen GmbH, Aachen, Fed. Rep. of Germany; a part interest

[21] Appl. No.: 151,463

[22] Filed: May 19, 1980

[30] Foreign Application Priority Data

Aug. 20, 1979 [FR] France ................................ 79 21013

[51] Int. Cl.³ ............................................. B60C 11/00
[52] U.S. Cl. .......................... 152/209 R; 152/209 D; 152/354 R; D12/143; D12/145
[58] Field of Search ....... 152/209 R, 209 D, 209 NT, 152/209 WT, 209 A, 209 B; D12/147, 141, 143, 145, 146; 192/354 R, 354 RB

[56] References Cited

U.S. PATENT DOCUMENTS

| | | | |
|---|---|---|---|
| D. 85,063 | 9/1931 | Sloman | D12/145 |
| 2,756,798 | 7/1956 | Palko et al. | 152/209 R |
| 3,409,064 | 11/1968 | Leonard | 152/209 R |
| 3,556,191 | 1/1971 | Mills | 152/209 R |
| 3,672,423 | 6/1972 | Duduk | 152/354 RB UX |
| 3,693,687 | 9/1972 | Hannover | 152/209 R |
| 4,289,182 | 9/1981 | Sato et al. | 152/209 R |

FOREIGN PATENT DOCUMENTS

918988 2/1963 United Kingdom ............ 152/209 R

*Primary Examiner*—Edward C. Kimlin
*Assistant Examiner*—Thomas Bokan
*Attorney, Agent, or Firm*—Becker & Becker, Inc.

[57] ABSTRACT

A tire tread pattern wherein all the ribs have a continuous structure in the circumferential direction, and more or less transverse notches provided in a given rib extend a predetermined distance beyond the center-line of that rib from a circumferential edge thereof.

7 Claims, 6 Drawing Figures

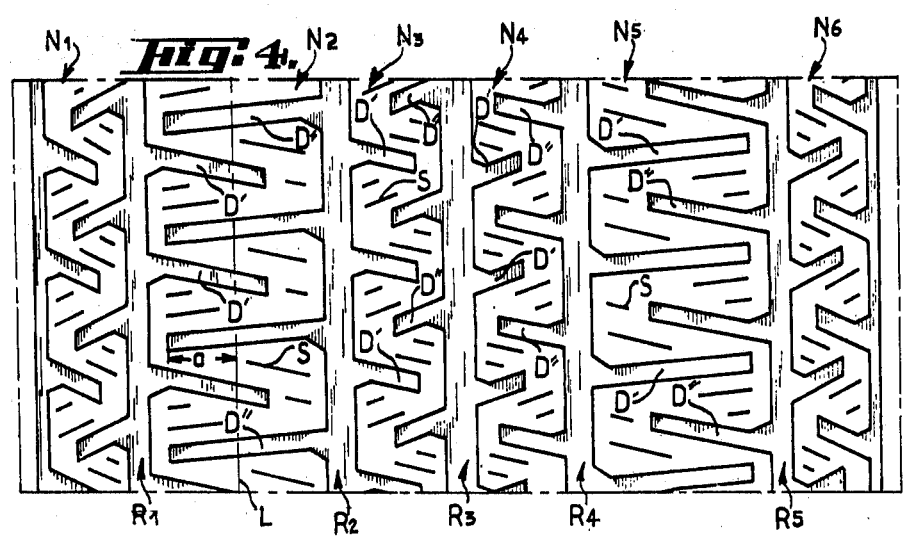
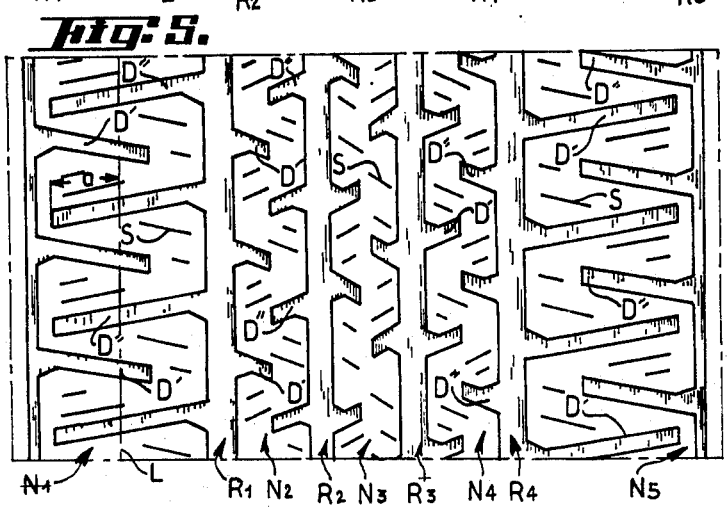
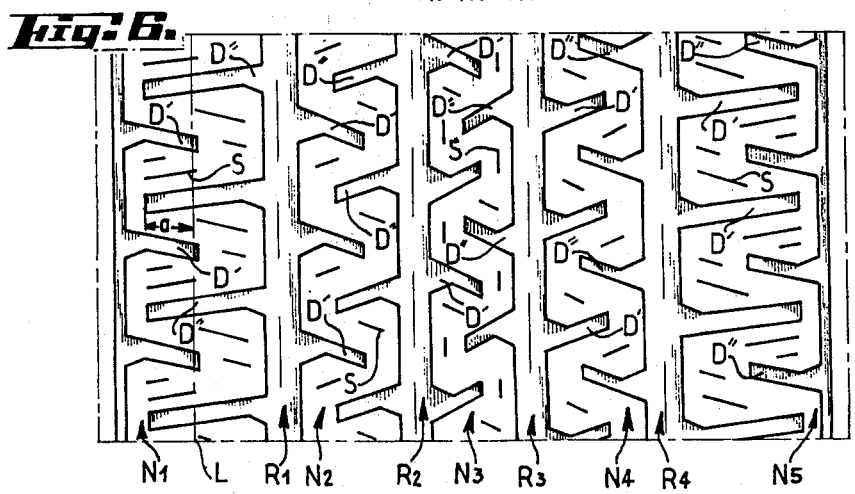

TIRE TREAD PATTERN

The present invention relates to improvements in tire casings, especially a tire tread pattern, design, or structure for tires designed for high speeds.

In particular, the invention relates to tires with a tread pattern comprising several circumferential ribs, rectilinear circumferential grooves, each located between two ribs, and notches provided in each rib and extending more or less transversely to the circumferential grooves at a predetermined angle thereto, the said notches being uniformly distributed all around the circumference of the said rib and being divided into two groups of notches, the notches of each group extending from an edge or a circumferential groove towards the interior of the rib.

It is known that transverse notches or slots allow lateral water outflow or removal. It is also known that a tire tread comprising ribs which are strongly structured, i.e., which comprise a relatively large number of raised elements, is generally favorable to accurate steering of the vehicle due to the thus reduced resistance to distortion of the tread elements. It is also known that the steering of the vehicle becomes easier, especially in particular situations, e.g., in case of deceleration or of acceleration, or on making a turn, if the tread is provided with continuous raised structures in its circumferential direction.

Due to the conflicting character of the various aforementioned requirements, no tire has been proposed up to the present to satisfactorily solve this complex problem.

In some known tires, the notches extend throughout the ribs, each notch being formed of two portions perpendicular to the circumferential direction of the tread, each of which opens into a groove and extends substantially to the middle of the rib. Those two portions are shifted from one another in the circumferential direction and are interconnected by a rectilinear notch portion. The connecting notch portions are smaller in width than the two other portions, so that they tend to close during a deceleration, an acceleration, or when making a turn. It is thus sought to obtain ribs having, in those particular circumstances, the properties of a continuous rib. However, such a tread pattern cannot be considered as a fully satisfactory approach to the problem, all the more so since the provisions made to ensure a certain continuity of the ribs are completely inefficient under rather normal driving conditions and at high speeds.

Another tire tread is known which comprises several continuous circumferential ribs, but with practically only incipient transverse notches. The raised circumferential regions located between the said ribs are provided in a location with wide transverse grooves which connect with the rectilinear circumferential grooves laterally thereby defining limits or boundary of the said raised regions. Also this solution, however, is unsatisfactory, for in such a tire tread the circumferential regions designed for water outflow, and the continuous ribs for favoring accurate steering of the vehicle, are only juxtaposed. As a consequence of such mere juxtaposition, neither water removal nor accurate steering are ensured in an efficient manner.

It is, therefore an object of the present invention to provide a tire tread pattern with which the problem set forth above can be solved.

Figure 2:
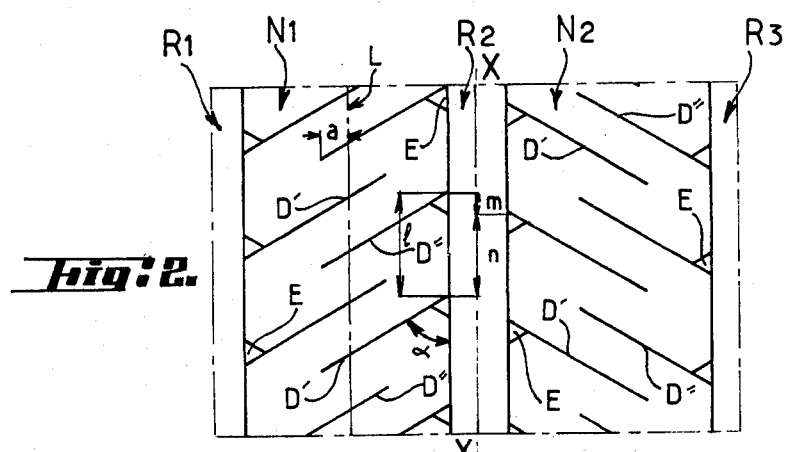
Figure 3:
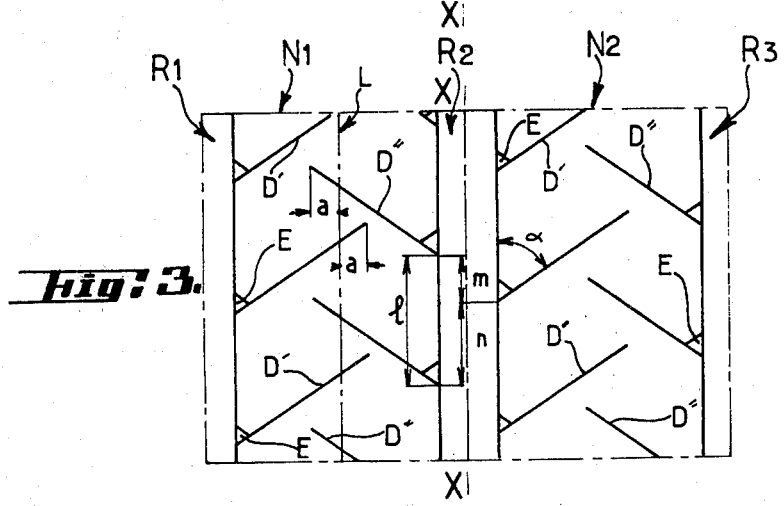

This object, and other objects and advantages of the present invention, will appear more clearly from the following specification in connection with the accompanying drawings, in which:

FIGS. 1 to 3 are diagrammatic broken-away top views illustrating the essential characterizing features of the tire tread according to the present invention, and FIGS. 4 to 6 are plan views illustrating three forms of embodiment of the tire tread according to the invention, with portions broken away transversely to the circumferential centerline of the tread.

The tire tread pattern according to the present invention is characterized primarily in that all the ribs present a continuous structure in the circumferential direction, and the transverse notches provided in a rib extend a predetermined distance beyond the center-line of the pertaining rib from a circumferential or longitudinal groove defining that rib.

According to an advantageous feature of the invention, the notches of a rib, and the notches of the adjacent rib, all of which open into the same circumferential groove, are shifted from one another in the circumferential direction of the tire tread at their opening into the said groove; the shift is different from half the distance between the regions of opening into a given groove of two adjacent notches of a given rib.

According to the invention, advantageous effects may be obtained when the direction, with respect to the circumferential direction of the tread, of the notches of a rib which open into a given circumferential groove, is opposite to that of the notches opening into the other groove, and/or when the direction of the notches of a rib is opposite to that of the notches of an adjacent rib.

Referring now to the drawings in detail, FIGS. 1 to 3 diagrammatically illustrate the principle of the tire tread pattern, design, or sculpture according to the present invention. The elements of the tire tread are generally designated by a letter, to which is added an index number where it is preferable, for a better understanding of the invention, to make a distinction between elements of a like nature.

The Figures are views with portions broken away in the circumferential direction and in the transverse direction. It appears from the Figures that the tire tread comprises circumferential ribs N laterally defined by circumferential grooves R. The ribs N and the grooves R are substantially rectilinear. For guidance only, the tread may generally have between at least three ribs and two grooves, and at most ten ribs and nine grooves, it being understood that the lateral ribs, i.e., those located at the edge of the tread, are not limited by a groove but adjoin directly the sidewalls of the tire casing.

As seen in the Figures, in each rib N there are provided notches D which, although referred to as transverse notches, form with the direction of the tread center-line XX an angle $\alpha$ which may be of the order of from 30° to 90°, preferably from 60° to 80°.

According to the invention, the notches D running from a circumferential groove R extend beyond the circumferential center-line L of a rib N by a predetermined distance designated by a. The distance a may be of the order of from $\frac{1}{2}$ to $\frac{2}{3}$ of half the width of the rib. Each rib N is provided with two groups of notches D', D", the notches D' of one group opening into one of the two circumferential grooves, e.g., the groove $R_1$ defining the rib $N_1$ on the left side, and the notches D" of the other group opening into the other groove, i.e., the groove $R_2$. The notches of a given group are parallel with one another, and the distance l in the circumferential direction of the rib between two notches of a same group varies all around the rib. There is thus obtained a configuration in which the notches D', D" of both groups overlap mutually in the region straddling the circumferential center-like L of a rib.

It is a significant feature of the invention that the notches D of one group of one rib, e.g., the notches D" in the rib $N_1$, and the notches D' of the adjacent rib $N_2$, all of which open into the same circumferential groove $R_2$, are shifted with respect to one another in the circumferential direction. Referring to the Figures, it is seen that the said shift is defined by the parting distances m and n designating respectively the distance, in the circumferential direction of the center-line XX, e.g., between the region of opening into the groove $R_2$ of a notch of the rib $N_2$ and the regions of opening into that same groove $R_2$ of the two notches D" of the adjacent rib $N_1$, which are located above and below the notch D', respectively. It appears from the Figures that the parting distances m and n are different from one another. By appropriately selecting m and n, it is possible to prevent the occurrence of an unpleasant running noise.

The Figures show that the notches open into their corresponding groove at a more or less acute angle thereto, thus resulting in the formation of a relief portion E in the form of a relatively sharp edge. Such an edge would be susceptible to rapid wear. According to the invention, the edges are bevelled or rounded off substantially down to the bottom of the notch. This allows the life of the tire tread to be increased.

It should be noted that the dimensions, such as the width and the depth, of the transverse notches may be either equal to or different from those of the circumferential grooves. In the case of unequal dimensions, it is those of the notches that are smaller than the corresponding dimensions of the grooves.

The characterizing features which have just been set forth are common to the three forms of embodiment diagrammatically illustrated in FIGS. 1 to 3. These three forms of embodiment differ in principle, particularly by the direction of the notches of the two groups of a given rib and of the two groups of a rib with respect to the notches provided in the adjacent rib.

According to FIG. 1, all the notches D', D" of a rib $N_1$, $N_2$ are parallel, are spaced, at the center-line L of the rib, the same distance $\frac{1}{2}$, and are directed at the same angle, with respect to the direction of the center-line XX, as are the notches of the adjacent rib $N_2$. This same direction of the notches of all the ribs results in a directing effect which causes the tread pattern to favor the production of a lateral force component that is greater in one running or rolling direction than in the other.

This directing effect does not appear in the case of the pattern illustrated in FIG. 2. In this Figure, the notches D provided in a given rib, e.g. the rib $N_1$, are again parallel but extend in an opposite angular direction, with respect to the direction XX, to that of the notches D of the adjacent rib $N_2$.

The form of embodiment represented in FIG. 3 differs from that of FIG. 2 by the fact that, in a given rib $N_1$, $N_2$, the notches D' extend in an opposite direction to that of the notches D" with respect to the circumferential direction of the tread.

FIGS. 1 to 3 show that in each of the three forms of embodiment just described, each rib $N_1$ and $N_2$ presents a continuous structure in the circumferential direction, since the transverse notches D never extend throughout a rib. It is obvious that the properties, e.g., the resiliency or the flexibility of the tread in the circumferential direction and in a transverse direction to the latter, may be influenced by an appropriate choice of the width of the ribs, the direction of the notches, and their degree of extension beyond the center-line L of a rib, which degree is defined by the ratio of the distance a to the width to the corresponding rib. The tread displays a good water removing capacity, while at the same time ensuring an accurate steering of the vehicle, when the distance a that the notches extend beyond the center-line of the rib is of the said order of $\frac{1}{2}$ to $\frac{2}{3}$ of half the width of the rib. The hydroplaning effect is thus efficiently reduced. In certain circumstances, however, a may be zero or even have a negative value.

FIGS. 4 to 6 illustrate three tread patterns which allow the advantageous possibilities offered by the tread pattern constituent elements just described to be turned to account. The patterns are particularly suited for use on tire casings for high speeds.

FIG. 4 diagrammatically illustrates a tread pattern preferably usable for a tire of the 195/70 HR 14 size. The tread comprises six ribs $N_1$–$N_6$, and five grooves $R_1$–$R_5$. The two medial ribs $N_3$, $N_4$, and the lateral ribs $N_1$, $N_6$, are smaller in width than the intermediate ribs $N_2$, $N_5$. The peculiarity of the pattern of FIG. 4 lies in the fact that in each of the inner ribs $N_2$ to $N_5$, the distance a that the notches extend beyond the center-line L is different for the two groups of notches D', D", and that the notches that open into the grooves $R_2$ and $R_4$ are longer than those of the other group of the same rib. Moreover, longer notches in the wider rib, i.e., notches D" in the rib $N_2$ and D' in the rib $N_5$, which are directed towards the edges of the tread, have a greater degree of extension beyond the center-line than do the notches D' and D" of the less-wide medial ribs $N_3$ and $N_4$, respectively. Also to be noted, as besides in the patterns of FIGS. 5 and 6, is the alternation of the direction, with respect to the circumferential direction, from one group of notches to the next group.

The provisions allow the resiliency of the tread pattern to be influenced in its circumferential direction, for the sides of the ribs in which the degree of extension of the notches beyond the center-line is greater display greater resiliency under the action of traction or braking forces, than the sides with a small degree of extension of the notches beyond the center-line. The tread pattern according to FIG. 4 thus imparts to the tire increased adhesion to the ground and higher resistance to slipping.

The pattern shown in FIG. 5 is designed so that the resiliency and the water guiding capacity increase gradually from the middle of the tread towards the lateral edges. To this end, the tread, which is particularly suited for use on tires of 185/60 HR 14 dimensions, comprises five ribs $N_1$–$N_5$, and four grooves $R_1$–$R_4$. The lateral ribs $N_1$ and $N_5$ are wider than the ribs $N_2$, $N_3$, and $N_4$. It is apparent from the Figure that the notches D' and D" are equal in length in each of the ribs $N_2$, $N_3$, $N_4$, but that the notches provided in the ribs $N_2$, $N_4$ are longer than the notches of the rib $N_3$. In contrast, in the lateral ribs $N_1$, $N_5$, which are wider than the middle ribs, the notches extending from the grooves $R_1$ and $R_4$, respectively, towards the edge of the tread, are longer than the inversely directed notches, i.e., towards the middle of the tread. Furthermore, the degree of extension of the longer notches (D" in the rib $N_1$ and D' in the rib $N_5$) beyond the center-line is greater than that of the notches provided in the ribs $N_2$, $N_3$, $N_4$.

Although, in FIG. 5, the notches in the medial rib $N_3$ fall short of the center-line of the rib, and in the ribs $N_2$ and $N_4$ the distance they extend beyond the center-line is very small or nill, it should be noted that the said notches may be longer. The important thing is the gradual increase in length of the notches and the structuration from the middle of the tread towards its edges.

The pattern according to FIG. 6 is particularly designed for tires of 190/65 HR 390 dimensions. This pattern differs from that of FIG. 5 by the increase in width of the ribs from the medial rib $N_3$ towards the edges of the tread. The ribs $N_2$, $N_3$, $N_4$ are each wider than the corresponding ribs of the pattern shown in FIG. 5. The notches in the rib $N_3$, as those of the ribs $N_2$ and $N_4$, extend beyond the center-line of their rib. Such a design allows a balanced resiliency to be obtained in the whole area of the tread pattern, a property that is particularly advantageous in tires intended for use at high speeds.

It should also be noted that in all the forms of embodiment just described, the widths of the circumferential ribs N of a tread may be different from one another, and that incisions S may be provided in any appropriate manner, e.g., as illustrated in FIGS. 4 to 6, in the ribs N of the tread.

Of course, the invention is by no means limited to the forms of embodiment described and illustrated, which have been given by way of example only. In particular, it comprises all means constituting technical equivalents to the means described as well as their combinations, if the latter are carried out according to its gist and used within the scope of the following claims.

What we claim is:

1. A tire tread pattern, which comprises in combination:
    a plurality of circumferential ribs spaced from one another with each rib extending laterally from a circumferential center line of the tire, each rib further having a fixed maximum width defined by two adjacent parallel circumferential lines, each of which lines lies completely within a single plane extending radially with respect to the tire and within which lines the lateral extent of the rib is confined; the parallel circumferential lines within which each rib is confined opposing the adjacent parallel circumferential lines defining the respective adjacent rib edge, to further define between the ribs a plurality of substantially rectilinear, circumferential grooves of substantially constant width; the grooves being free of any portions of said ribs in the area between the circumferential parallel lines defining the grooves;
    laterally extending notches distributed around the circumference of each rib and each notch center line being inclined with respect to the circumferential center line and axial width of each rib;
    each rib having two groups of notches with one group along each edge of the rib, and the notches of each group extending inwardly from their respective rib edge toward the interior of the rib a predetermined distance beyond the center line of the rib;
    the notches in a given rib and the notches in an adjacent rib edge which open into a common groove being shifted in the circumferential direction, wherein the notches of said given rib open into said common groove at a different location than the notches of the adjacent rib, when viewed in the circumferential direction; the location of each notch in the given rib being displaced from half the distance between two adjacent notches in the adjacent rib; and
    the notches of one group of notches of a given rib extending in a first direction with respect to the circumferential direction, and the other notches of the given rib extending in a second direction opposite to the first direction.

2. The tire tread pattern of claim 1 wherein the distance that the notches of one group of notches in a rib extend beyond the circumferential center line of the rib is different from the distance that the notches of the other group of notches of the same rib extend beyond the center line of the rib, and wherein the notches of one group of notches of a given rib extend in a first direction with respect to the circumferential direction and the other group of notches of said given rib extend in a second direction opposite to the first direction.

3. The tire tread pattern of claim 1 wherein the tire has outboard ribs positioned adjacent the edges of the tread and inboard ribs positioned between the outboard ribs with the outboard ribs being wider than the inboard ribs and with the notches in the outboard ribs being longer than the notches in the inboard ribs.

4. The tire tread pattern of claim 3 wherein there are at least four circumferential ribs including two inboard ribs and two outboard ribs, wherein the group of notches in the outboard ribs which open into the groove between the outboard ribs and inboard ribs are longer than the other group of notches in each outboard rib.

5. The tire tread of claim 4 wherein notches comprising one group of notches in each outboard rib extend in a first direction with respect to the circumferential center-line and the other group of notches in each outboard rib extend in a second direction opposite to the first direction; whereby an increase in resiliency of the tread and the water guiding capacity thereof increase gradually from the center-line of the tread toward the outer edges of the tread.

6. The tread pattern of claim 5 wherein the tread has at least five circumferential ribs with the widths of the ribs increasing from the center of the tread toward the edges of the tread and with the extension of the notches in each rib past the center-line of each rib increasing with the increases in width whereby a balanced resiliency over the tread pattern with enhanced water removed at high speeds is obtained.

7. The tire tread pattern of claim 1 wherein the distance beyond the center line of each rib that one group of notches in the rib extends is greater than the distance beyond the center line that the other group of notches extends, and wherein the notches of the two groups of notches in a given rib extend in different directions with respect to the circumferential direction.

* * * * *